United States Patent [19]
Glaser et al.

[11] 3,878,937
[45] Apr. 22, 1975

[54] ENDLESS BELT CONVEYOR SYSTEM
[76] Inventors: Charles Jerome Glaser; Donald L. Theobald; James R. Glaser, all of 2501 Neff Ave., Dayton, Ohio 45414
[22] Filed: July 5, 1973
[21] Appl. No.: 376,602

[52] U.S. Cl. ............... 198/203; 178/204; 178/208
[51] Int. Cl. ............................................ B65g 23/22
[58] Field of Search ........... 198/203, 204, 208, 213, 198/233

[56] References Cited
UNITED STATES PATENTS

| | | | |
|---|---|---|---|
| 2,243,538 | 5/1941 | Salfisberg | 198/203 |
| 2,718,296 | 9/1955 | Johnson | 198/204 |
| 3,125,211 | 3/1964 | Macy | 198/213 |
| 3,236,364 | 2/1966 | Mayrath | 198/213 |
| 3,414,115 | 12/1968 | Gates et al. | 198/208 |
| 3,605,994 | 9/1971 | Parlette | 198/204 |

Primary Examiner—James B. Marbert
Assistant Examiner—Jeffrey V. Nase
Attorney, Agent, or Firm—Jacox & Meckstroth

[57] ABSTRACT

A set of parallel spaced extruded aluminum side rails are rigidly connected by a pair of generally flat bed plates, and a belt guide roller extends between the outer ends of the side rails. A set of cast end plates are secured to the opposite or inner ends of the side rails and support a belt drive roller and an adjustable belt snubbing roller. An endless conveyor belt extends around or over the rollers, and the drive roller is driven by a motor-drive unit which is supported by a bracket mounted on a set of parallel cross rods extending between the end plates. The cross rods are rearrangeable on the end plates in different parallel positions, and the motor support bracket is mountable on the cross rods in different positions for selectively locating the motor-drive unit in a number of different positions relative to the drive roller and conveyor belt according to the space available for receiving the conveyor system.

7 Claims, 5 Drawing Figures

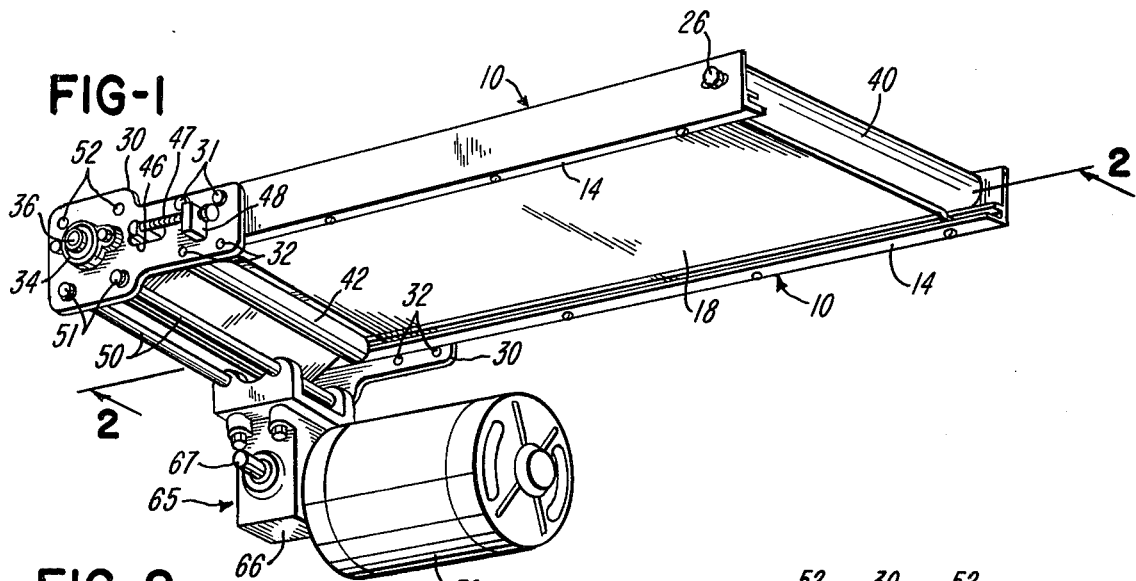
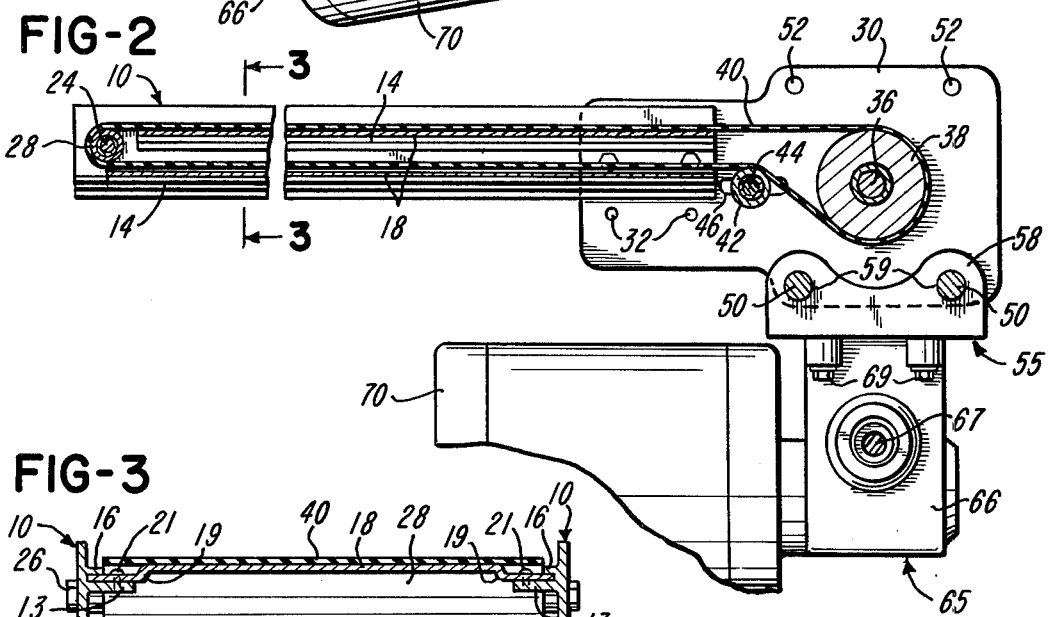
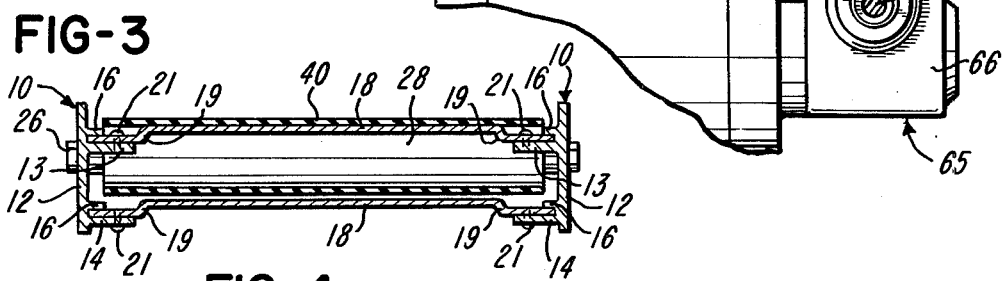
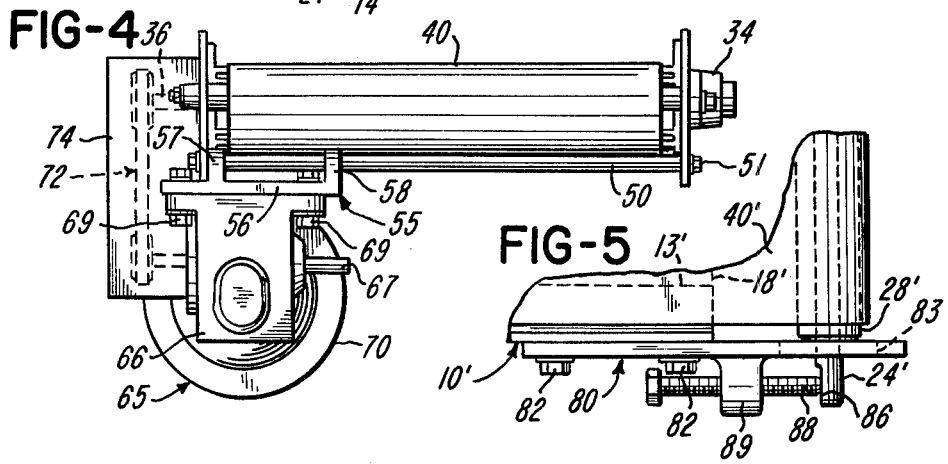

ENDLESS BELT CONVEYOR SYSTEM

BACKGROUND OF THE INVENTION

In the production of parts with a mechanical punch press or plastics injection molding machine, or other similar machine, it is frequently desirable to transport or convey the parts automatically from the machine to a remote area where the parts are packaged or collected for additional secondary operations. There have been many various forms of endless belt conveyors either constructed or proposed for use with such machines and for installing either under, through or adjacent the machine. For example, it is sometimes desirable to install an endless belt conveyor under the base or boaster plate of a mechanical or hydraulic press and to locate the drive motor for the conveyor under the conveyor belt so that the overall width and length of the conveyor system can be minimized. It is also desirable for such an endless belt conveyor to be of simple and economical construction and also to be designed for convenient construction in various lengths and widths.

SUMMARY OF THE INVENTION

The present invention is directed to an improved endless belt conveyor system which provides all of the desirable features mentioned above. In particular, the construction and assembly of the conveyor system of the invention, provides a high degree of versatility so that the conveyor system may be conveniently and efficiently constructed in different lengths and widths, and the motor drive unit may be conveniently located at various different positions according to the dimensions of the space available for receiving the conveyor system.

In general, the above features and advantages are provided by a conveyor assembly or system which includes a set of parallel spaced extruded aluminum side rails which have inwardly projecting opposing flanges rigidly connected by a pair of generally flat bed plates. An endless conveyor belt is supported by the bed plates and is directed around a tail roller located between the outer ends of the side rails and also around a drive roller and a snubbing roller located between parallel spaced end plates secured to the opposite ends of the side rails.

A pair of parallel spaced rods also extend between the end plates and support a bracket which receives the rods and supports a gear reducer coupled directly to a drive motor. The support bracket may be positioned at opposite ends of the cross rods, and the cross rods may be relocated on the end plates to provide for positioning the motor-gear reducer drive unit in any one of at least twelve different positions adjacent one end of the conveyor belt.

Other features and advantages of the invention will be apparent from the following description, the accompanying drawing and the appended claims.

BRIEF DESCRIPTION OF THE DRAWING

FIG. 1 is a perspective view of an endless belt conveyor constructed in accordance with the invention and showing its underneath side;

FIG. 2 is a vertical section of the conveyor as taken generally on the line 2—2 of FIG. 1;

FIG. 3 is a fragmentary section taken generally on the line 3—3 of FIG. 2;

FIG. 4 is an elevational end view of the conveyor, as seen from the left end of the conveyor shown in FIG. 1; and FIG. 5 is a fragmentary plan view of a modification of the belt conveyor shown in FIGS. 1-4.

DESCRIPTION OF THE PREFERRED EMBODIMENT

The conveyor system shown in FIGS. 1-4, includes a pair or set of parallel spaced side rails 10 which are constructed of sections of an aluminum extrusion. Each of the side rails 10 includes a vertical side wall 12 (FIG. 3) and inwardly projecting integral flanges 13 and 14 each of which cooperates with a corresponding smaller flange 16 to define a longitudinally extending slot or groove. The side rails 10 are rigidly connected by a pair of upper and lower slider bed plates 18 each of which is substantially flat except for longitudinally extending opposite edge portions 19 which are offset slightly downwardly relative to the main or intermediate portion of the bed plate. The opposite edge portions 19 of each bed plate 18 project between the corresponding flanges 13 and 16 of the side rails 10 and are rigidly secured to the flanges 13 by a series of longitudinally spaced rivets 21.

A tail shaft 24 extends between the outer ends of the side rails 10 adjacent the corresponding ends of the bed plates 18, and the ends of the tail shaft 24 are rigidly secured to the side rails 10 by a set of screws 26. The shaft 24 supports a set of anti-friction bearings (not shown) which, in turn, support a tail pulley or roller 28.

A pair of cast aluminum end plates 30 are secured to the opposite ends of the side rails 10 by a set of bolts 31 which extend through corresponding holes 32 formed within the end plates 30. The end plates 30 also support a set of antifriction bearings 34 (FIG. 1) which rotatably support a drive shaft 36 (FIG. 2). A drive pulley or roller 38 is secured to the drive shaft 36, and the drive roller 38 is positioned so that its top is flush or level with the top surface of the upper bed plate 18.

An endless flexible conveyor member or belt 40 extends around the tail roller 28 and the drive roller 38 and has an upper run which slides on the upper bed plate 18. The lower run of the conveyor belt 40 extends between the bed plates 18 and slides on the top surface of the lower bed plate. The belt 40 also extends over the top of a snub roller 42 which extends between the end plates 30 and is rotatably supported by anti-friction bearings (not shown) mounted on a cross shaft 44. The end portions of the shaft 44 project through corresponding slots 46 (FIG. 1) formed within the end plates 30 and are provided with flat surfaces for engagement by corresponding adjustment screws 47. Each screw 47 extends through a threaded hole formed within a stud or projection 48 cast as an integral part of the corresponding end plate 30. As apparent in FIG. 2, the tension of the belt 40 is determined by the position of the snub roller 42 relative to the drive roller 38.

A pair of parallel spaced cylindrical rods 50 extend laterally between the end plates 30 and are rigidly secured to the end plates by corresponding screws 51. The screws 51 extend through a set of holes 52 formed within the end plates and are threaded into the ends of the rods 50. As shown in FIGS. 1 and 2, each of the end plates 30 has four holes 52 which are equally spaced or located at the corners of a square so that the rods 50 may be positioned in horizontally spaced relation either above or below the drive roller 38 or in vertically spaced relation adjacent the end of the conveyor belt 40.

A cast aluminum bracket 55 includes a base wall 56 and two projecting flange portions 57 and 58 which cooperate to form an F-shaped configuration (FIG. 4). The flange portions 57 and 58 each have a set of holes 59 for receiving the cross rods 50 so that the base wall 56 of the bracket 55 extends parallel to the center plane of the cross rods 50.

A motor drive unit 65 is supported by the bracket 55 and includes a gear reducer 66 having an output shaft 67. The base of the gear reducer 66 is secured to the bracket 55 by a set of bolts 69. The input shaft (not shown) for the gear reducer 66 is also the shaft of an electric motor 70 which is coupled directly to the gear reducer 66. As shown in FIG. 4, a V-belt drive 72 connects the output shaft 67 of the gear reducer 66 to the outer projecting end portion of the drive shaft 36 which extends through the conveyor belt drive roller 38. The V-belt drive 72 is covered or protected by a housing 74 which is secured to the adjacent end plate 30 with a set of screws (not shown). While an electric motor 70 is illustrated, it is to be understood that other motors such as a fluid motor, may also be used for driving the conveyor belt 40.

FIG. 5 shows a modification of a conveyor system constructed in accordance with the present invention. Instead of mounting the tail roller shaft 24 directly on the outer or tail ends of the side rails 10, which requires notching the flanges 13 and 16 as shown in FIG. 2, a modified tail roller shaft 24' is supported by a pair of elongated cast metal brackets 80. Each of the brackets 80 has a rectangular configuration when viewed in side elevation and has a width which is the same as the width of the extruded aluminum side rails 10', for example, two inches. The brackets 80 are secured to the outer or tail ends of the side rails 10' by a set of corresponding screws 82, and each of the brackets 80 is provided with a horizontal slot 83 through which projects the corresponding end portion of the tail roller shaft 24'.

A flat 86 is formed on each outer end portion of the shaft 24' and is engaged by the end of a corresponding adjustment screw 88 which extends through a threaded hole formed within a projection 89 cast as an integral part of the corresponding bracket 80. The adjustment of the screws 88 provides not only for tensioning the endless conveyor belt 40' to compensate for stretch in the belt, but also provides for adjusting the tail roller 28' so that its axis is precisely parallel with the axis of the drive pulley or roller shaft 36 to assure that the endless belt 40' runs smoothly between the rollers without rubbing the side rails 10'. The spacing between the screws 82 is the same as the spacing between the screws 31 so that the pair of rails 10' are identical, and the same tooling can be used for punching the holes which receive the screws.

From the drawing and the above description, it is apparent that an endless belt conveyor system constructed in accordance with the present invention, provides several desirable features and advantages. For example, the end plates 30 cooperate with the cross rods 50 and the bracket 55 to provide for arranging the bracket 55 in a number of different positions relative to the side rails. Thus the motor drive unit 65 may be selectively located in a number of different positions according to the space available for receiving or installing the conveyor system.

More specifically, the selective arrangement of the cross rods 50, and the mounting of the bracket 55 on the cross rods, provide for positioning the bracket 55 in three different angular positions on either side of the conveyor adjacent either of the end plates 30. That is, the support bracket 55 and drive unit 65 may be positioned relative to each end plate 30 either below or above the drive roller 38 or at the end of the endless belt 40 so that the gear reducer 66 projects horizontally from the belt 40. In addition, since either end of the output shaft 67 may be used for driving the shaft 36, the motor drive unit 65 may be orientated on the support bracket 55 in either of two positions, located 180° from each other. Thus the motor drive unit 65 may be positioned in any one of six positions relative to each of the end plates 30, or a total of twelve different positions relative to the conveyor belt 40.

Another important feature is provided by the construction of the side rails 10 and the connecting bed plates 18. Since the side rails 10 are formed of sections of an aluminum extrusion, and the bed plates 18 are simply formed of flat sheet metal, the length of the conveyor may be conveniently changed simply by changing the lengths of the side rails 10, the bed plates 18 and the conveyor belt 40. The width of the conveyor may also be conveniently changed simply by changing the width of the bed plates 18 and the length of the cross rods 50 and the rollers 28, 38 and 42. In addition, the brackets 80 provide for adjustably supporting the tall roller 28 and simplify the production of the side rails 10'.

While the forms of conveyors herein described constitute preferred embodiments of the invention, it is to be understood that the invention is not limited to these precise forms of conveyors, and that changes may be made therein without departing from the scope and spirit of the invention as defined in the appended claims. For example, two or more endless belts may be used in place of the single belt 40, and the belts may be spaced apart according to the size of the parts to be transported.

The invention having thus been described, the following is claimed:

1. An improved conveyor system adapted to be assembled in various arrangements for use in compact spaces of different dimensions, comprising a set of parallel spaced elongated side rails having corresponding first end portions and opposite second end portions, said side rails also having substantially uniform cross-sectional configuration and inwardly projecting opposing integral flanges, at least one generally flat bed plate extending between said side rails and rigidly connecting said flanges, a tail roller extending adjacent corresponding said first end portions of side side rails and supported thereby, a set of generally parallel spaced end plates secured to the opposite said second end portions of said side rails, a drive roller extending between said end plates and supported thereby, an endless flexible conveyor belt extending around said tail roller and said drive roller, a set of parallel spaced support rods extending between said end plates and rigidly connecting said end plates, a bracket member having means defining openings for receiving said support rods, a motor drive unit mounted on said bracket member and having an output shaft connected to drive said drive roller and said conveyor belt, and means for arranging said support rods and said bracket member to provide for selectively positioning said motor drive unit in a plurality of different positions adjacent each of said end plates.

2. A conveyor system as defined in claim 1 wherein said support rods and said bracket member provide for selectively supporting said motor drive unit at different angular positions relative to said drive roller and adjacent each of said end plates.

3. A conveyor system as defined in claim 2 wherein said support rods and said bracket member provide for supporting said motor drive unit with said drive roller positioned between said bed plate and said drive unit.

4. A conveyor system as defined in claim 1 including means for securing said support rods to said end plates in a plurality of different parallel arrangements with the same spacing between said rods.

5. A conveyor system as defined in claim 1 wherein said bed plate includes a generally flat main intermediate portion and laterally offset edge portions extending substantially parallel to said intermediate portion, and fastener means connecting said edge portions to the corresponding said flanges.

6. A conveyor system as defined in claim 1 including a snub roller extending between said end plates adjacent said side rails for guiding said belt, and means for adjusting the position of said snub roller relative to said end plates for controlling the tension of said conveyor belt.

7. An improved conveyor system adapted to be assembled in various arrangements for use in compact spaces of different dimensions, comprising a set of parallel spaced elongated side rails having corresponding first end positions and opposite second end positions, said side rails also having substantially uniform cross-sectional configuration and inwardly projecting opposing integral flanges, at least one generally flat bed plate extending between said side rails and rigidly connecting said flanges, a tail roller extending adjacent corresponding said first end portions of said side rails and supported thereby, a set of generally parallel spaced end plates secured to the opposite said second end portions of said side rails, a drive roller extending between said end plates and supported thereby, an endless flexible conveyor belt extending around said tail roller and said drive roller, a set of parallel spaced support rods extending between said end plates and rigidly connecting said end plates, a bracket member having means defining openings for receiving said rods, a motor drive unit mounted on said bracket and having an output shaft connected to drive said drive roller and said conveyor belt, and means for arranging said support rods and said bracket member to provide for selectively positioning said motor drive unit generally between said end plates and in different angular positions relative to said drive roller.

* * * * *